(12) United States Patent
Clark

(10) Patent No.: US 7,095,369 B1
(45) Date of Patent: Aug. 22, 2006

(54) PHASE STEP ALERT SIGNAL FOR GPS INTEGRITY MONITORING

(75) Inventor: Ronald H. Clark, Cupertino, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 123 days.

(21) Appl. No.: 10/866,813

(22) Filed: Jun. 15, 2004

(51) Int. Cl.
G01S 5/02 (2006.01)
H04B 7/185 (2006.01)

(52) U.S. Cl. .............................. 342/357.02; 342/357.06
(58) Field of Classification Search ........... 342/357.02, 342/357.05, 357.06, 372; 701/207, 213, 701/215
See application file for complete search history.

(56) References Cited

U.S. PATENT DOCUMENTS

| 6,603,426 | B1 | 8/2003 | Clark |
| 6,650,896 | B1* | 11/2003 | Haymes et al. .............. 455/423 |
| 6,741,842 | B1* | 5/2004 | Goldberg et al. ......... 455/192.2 |
| 2005/0096844 | A1* | 5/2005 | Pasturel et al. ............. 701/214 |
| 2005/0146461 | A1* | 7/2005 | Pande et al. ........... 342/357.02 |

* cited by examiner

*Primary Examiner*—Dao L. Phan
(74) *Attorney, Agent, or Firm*—McDermott Will & Emery LLP

(57) ABSTRACT

Alerting a user of an integrity error in a global positioning system (GPS) signal transmitted from a transmitter in a global positioning system (GPS) satellite, by detecting an error in the global positioning system (GPS) signal, alerting the user of the error by shifting a phase of the global positioning system (GPS) signal from an initial value by a predetermined phase-shift amount, and returning, in the case that the detected error is corrected, the phase of the global positioning system (GPS) signal to the initial value. Preferably, the GPS signal is phase-shifted by the predetermined phase-shift amount using an alert timing pattern which indicates the level of detected error.

16 Claims, 7 Drawing Sheets

PHASE STEP ALERT SIGNAL FOR GPS INTEGRITY MONITORING

STATEMENT AS TO RIGHTS TO INVENTIONS MADE UNDER FEDERALLY SPONSORED RESEARCH OR DEVELOPMENT

NOT APPLICABLE TO THIS INVENTION.

BACKGROUND OF THE INVENTION

1. Field of the Invention

The present invention concerns providing an integrity alert to a user of the Global Positioning System (GPS) when the signal contains an error. Specifically, the invention concerns alerting the user of the signal error by shifting the phase of the Global Positioning System (GPS) signal from an initial value by a predetermined phase-shift amount.

2. Description of the Related Art

The use of the Global Positioning System (GPS) is increasing rapidly in a variety of applications. Accordingly, the users of GPS expect to have, and often must have, confidence in the integrity and accuracy of the GPS signal. U.S. Pat. No. 6,603,426, (hereinafter "the '426 patent"), issued Aug. 5, 2003, sets forth one solution to this problem by the same applicant of the present invention.

As explained in the Background section of the '426 patent, the Global Positioning System (GPS) consists of 24 earth-orbiting satellites. The GPS satellites broadcast a navigation message via a radio frequency (RF) signal. This signal allows any individual with a GPS receiver to process the GPS signals and determine his or her precise longitude, latitude, altitude, velocity and time anywhere in the world.

Although the Global Positioning System (GPS) provides very accurate position and time information, there are times when GPS satellite system malfunctions can introduce errors into the GPS signal transmitted from the GPS satellite. When this occurs, the GPS receivers will not be able to accurately determine position and/or time. Past data has shown that the GPS signal has typically malfunctioned on the average of around 45 minutes a year. When the GPS satellite system is functioning properly and producing accurate GPS data, the GPS data is described as having "integrity."

GPS signal errors can be caused by a number of conditions. For example, if one of the GPS satellite transmitter elements, or any of the other satellite components, fail, the GPS signal waveform can become corrupted. For example, an output amplifier in the GPS satellite may start to malfunction and thereby corrupt the transmitted signal. Another source of error is a failure of the satellite's atomic clock. If a clock failure occurs, the satellite will transmit incorrect time data and introduce error into the computed position information. Another potential error is the transmission of erroneous correction data from GPS ground stations to GPS satellites. GPS ground stations uplink correction data to the GPS satellites every 24 hours. If a ground station sends the wrong correction data, then the GPS satellites will produce inaccurate or erroneous output signals. As an example of this type of error, a ground station could mistakenly send correction data for Tuesday when it was supposed to send correction data for Wednesday.

Errors in GPS signals can lead to severe safety issues or inefficient operation for many systems that use GPS signals, such as aircraft systems, transportation systems, weapon systems and so forth. New aircraft navigation systems are being developed which rely on GPS signals for navigation. It can be appreciated that errors in the received GPS signal in an aircraft navigation system could lead to mid-air crashes or other dangerous situations. The Federal Aviation Administration (FAA) has a goal of having no more than a 2 times $10^{-8}$ probability of error in the GPS signal without an alert that the signal is hazardous or misleading. With the current GPS system, the probability of error in the GPS signal is on the order of $10^{-4}$ per satellite per hour or even higher. Thus, for example, it is possible that a current GPS satellite could produce a probability of error ten thousand times higher than the FAA's desired goal.

One of the proposed systems that will utilize GPS is an intelligent highway system. Intelligent highway systems would use GPS signals to manage traffic by providing autonavigation for the automobiles on the freeways. Similar systems have been proposed for trains. Thus, it will be a very important safety issue for these systems to ensure the integrity of the received GPS signals.

Currently, the Global Positioning System (GPS) system does not have any form of integrity monitoring as part of the system. A system known as the "Wide Area Augmentation System" (WAAS) is currently being designed and developed to provide integrity monitoring of GPS. The WAAS will use a series of new ground stations at known locations all over the world. Each ground station will include a satellite antenna which receives GPS signals from the in-view GPS satellites. Each ground station will use these GPS signals to calculate its own position. By comparing the calculated position with the known position of the ground system, the accuracy and the integrity of the GPS signal of each corresponding in-view GPS satellite can be determined.

If the calculated position is different from the known position of the WAAS ground station, a correction message is generated by the ground station. The ground station transmits the correction message to an independent messaging system, such as a geosynchronous satellite. This geosynchronous messaging satellite then broadcasts the correction message to all GPS users in the region. The GPS users then use the correction message to correct the GPS data received from the GPS satellites. Alternatively, the geostationary messaging satellite can transmit an integrity message to all GPS users in the region, informing the users of a potential satellite malfunction. GPS users can thereby be informed that they should not rely on the GPS signals being received. Alternatively, the ground system could send the integrity message to a mission control system which sends a message to the GPS satellites to correct the erroneous data or to cease transmitting all GPS navigation data.

The WAAS integrity monitoring system will require an enormous cost including the cost of building the new WAAS ground stations, procuring the new geostationary messaging satellites, and the costs of maintaining and operating the ground stations. Estimated costs for the development and implementation of WAAS are greater than 2 billion dollars. Moreover, the WAAS may not be able to signal a problem with GPS integrity with sufficient speed. Many systems, such as aircraft navigation systems, using GPS frequently need to know of a change in GPS signal integrity in times less than 1 sec after a malfunction or error occurs.

The '426 patent offers one solution to the GPS integrity problem by having each GPS satellite verify the accuracy and/or integrity of its own operations by calculations and processing internal to the GPS satellite and by crosslink communications with other GPS satellites in the GPS constellation, after which the GPS satellite transmits an integrity message to all GPS users in view of the satellite, the integrity message being either incorporated into the existing GPS navigation message, or being transmitted over a separate communication channel. This solution offers the GPS user the ability to monitor the GPS integrity message to determine whether any errors exist in the received GPS navigation signal. Although the solution of the '426 patent provides a reliable way for GPS users to be alerted to inaccuracies in the GPS signal, the solution requires the GPS user to read the GPS integrity message to determine if any error exists, and the magnitude of the error. Time is required to read the integrity message, and if the integrity message is transmitted over a separate communication channel, the GPS user must have an upgraded receiver capable of receiving the separate communication channel.

What is needed is a system that can provide a high-level of confidence in GPS integrity by alerting GPS users to a loss of GPS signal integrity with sufficient speed to satisfy safety concerns and regulatory standards, without the need for using a separate communication channel, and without the enormous cost and complexity associated with a system such as the WAAS.

SUMMARY OF THE INVENTION

The present invention solves the above problems by providing the ability of a GPS satellite to verify the accuracy and/or integrity of its own GPS signal, and then alert a user of the GPS signal error by shifting the phase of the GPS signal from an initial value by a predetermined alert phase-shift amount. The GPS user/receiver can detect the phase shift which indicates an error, and then decide whether or not to use, or continue using, that particular GPS signal.

Specifically, according to one aspect of the invention, a user is alerted of an integrity error in a global positioning system (GPS) signal transmitted from a transmitter in a global positioning system (GPS) satellite, by detecting an error in the global positioning system (GPS) signal, alerting the user of the error by shifting a phase of the global positioning system (GPS) signal from an initial value by a predetermined phase-shift amount, and returning, in the case that the detected error is corrected, the phase of the global positioning system (GPS) signal to the initial value.

Preferably, the invention further includes quantifying an error amount for the error in the global positioning system (GPS) signal, setting an alert timing pattern for shifting the phase by the predetermined phase-shift amount in accordance with the quantified error amount, wherein the user is alerted of the error by shifting a phase of the global positioning system (GPS) signal from an initial value by the predetermined alert phase-shift amount in accordance with the alert timing pattern. The invention also preferably includes correcting the error in the global positioning system (GPS) signal, and then confirming the correction to the user by shifting the phase of the global positioning system (GPS) signal by the predetermined phase-shift amount according to a confirmation timing pattern. Also, the alert timing pattern preferably includes repeatedly shifting the GPS signal on and off by the predetermined phase-shift amount in a plurality of cycles, wherein the time of each cycle is indicative of the magnitude of the detected GPS signal error.

In this manner, the present invention provides the ability of a GPS satellite to verify the accuracy and/or integrity of its own GPS signal, and then alert a user of the GPS signal error simply by shifting the phase of the GPS signal from an initial value by a predetermined phase-shift amount. The GPS user/receiver can then detect the phase shift timing which indicates an error with the GPS signal, and decide whether or not to use, that particular GPS signal. Confidence in the integrity of the GPS signal is thereby simply provided to the user without the need for a separate communication channel, and without the need for a costly and complex ground integrity system.

According to another aspect, the invention concerns alerting a user of an integrity error in a global positioning system (GPS) signal transmitted from a transmitter in a global positioning system (GPS) satellite, by detecting an error in the global positioning system (GPS) signal, quantifying an error amount for the error in the global positioning system (GPS) signal, setting an alert timing pattern for shifting the phase by the predetermined phase-shift amount in accordance with the quantified error amount, alerting the user of the error by shifting a phase of the global positioning system (GPS) signal from an initial value by the predetermined phase-shift amount in accordance with the alert timing pattern, correcting the error in the global positioning system (GPS) signal, confirming the correction to the user by shifting the phase of the global positioning system (GPS) signal by the predetermined phase-shift amount in accordance with a confirmation timing pattern, and returning the phase of the global positioning system (GPS) signal to the initial value.

Preferably, the alert timing pattern shifts the phase on and off by the predetermined phase-shift amount in cycles, wherein the time of each cycle indicates the magnitude of the detected GPS signal error.

In this manner, the present invention provides the ability of a GPS satellite to verify the accuracy and/or integrity of its own GPS signal, and then alert a user of the GPS signal error simply by shifting the phase of the GPS signal from an initial value by a predetermined phase-shift amount according to a timing pattern. The GPS user/receiver can then detect the phase shift which indicates an error with the GPS signal, and decide whether or not to use that particular GPS signal. Confidence in the integrity of the GPS signal is thereby simply provided to the user without the need for a separate communication channel, and without the need for a costly and complex ground integrity system.

DETAILED DESCRIPTION

As mentioned above, the present invention is generally directed to system and method for providing the ability of a GPS satellite to verify the accuracy and/or integrity of its own GPS signal, and alerting a user of the GPS signal error by shifting the phase of the GPS signal from an initial value by a predetermined phase-shift amount according to a timing pattern. The GPS user/receiver can detect the phase shift which indicates an error, and decide whether or not to use, or continue using, that particular GPS signal.

Figure 1:
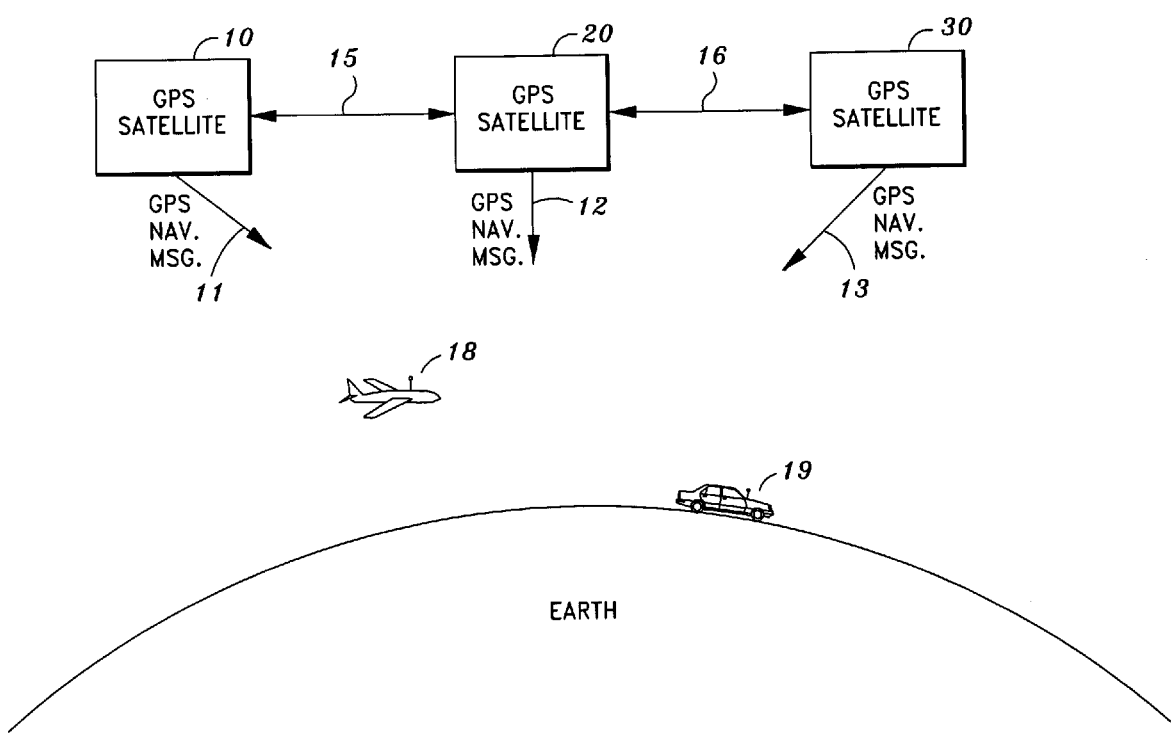
FIG. 1 is a basic drawing depicting a global positioning system (GPS) environment in which the present invention can be practiced, according to one embodiment of the invention.

Turning to the drawings, FIG. 1 shows a global positioning system (GPS) environment in which the present invention can be practiced. As seen in FIG. 1, the global positioning system (GPS) includes in-view GPS satellites 10, 20 and 30 which transmit GPS navigation signals 11, 12 and 13, respectively. A receiver can be used to receive GPS navigation signals 11, 12 and 13 and then determine the position of the receiver based on the position data in each of GPS navigation signals 11, 12 and 13. As discussed above, it is desirable for the GPS receiver to know whether or not there is a problem with the integrity of a received GPS navigation signal. For example, airplane 18 and automobile 19 shown in FIG. 1 contain GPS receivers in order to receive GPS navigation signals 11, 12, and 13 and determine their current position. In the case of airplane 18, the position data can be used in an onboard flight navigation system. It can be appreciated that airplane 18 should only use a GPS navigation signal that has a high degree of integrity, and that airplane 18 should process the received GPS navigation signal as quickly as possible in order to immediately obtain a current position. Any significant errors or delays in the position of airplane 18 can result in dangerous, if not tragic, consequences.

Figure 2:
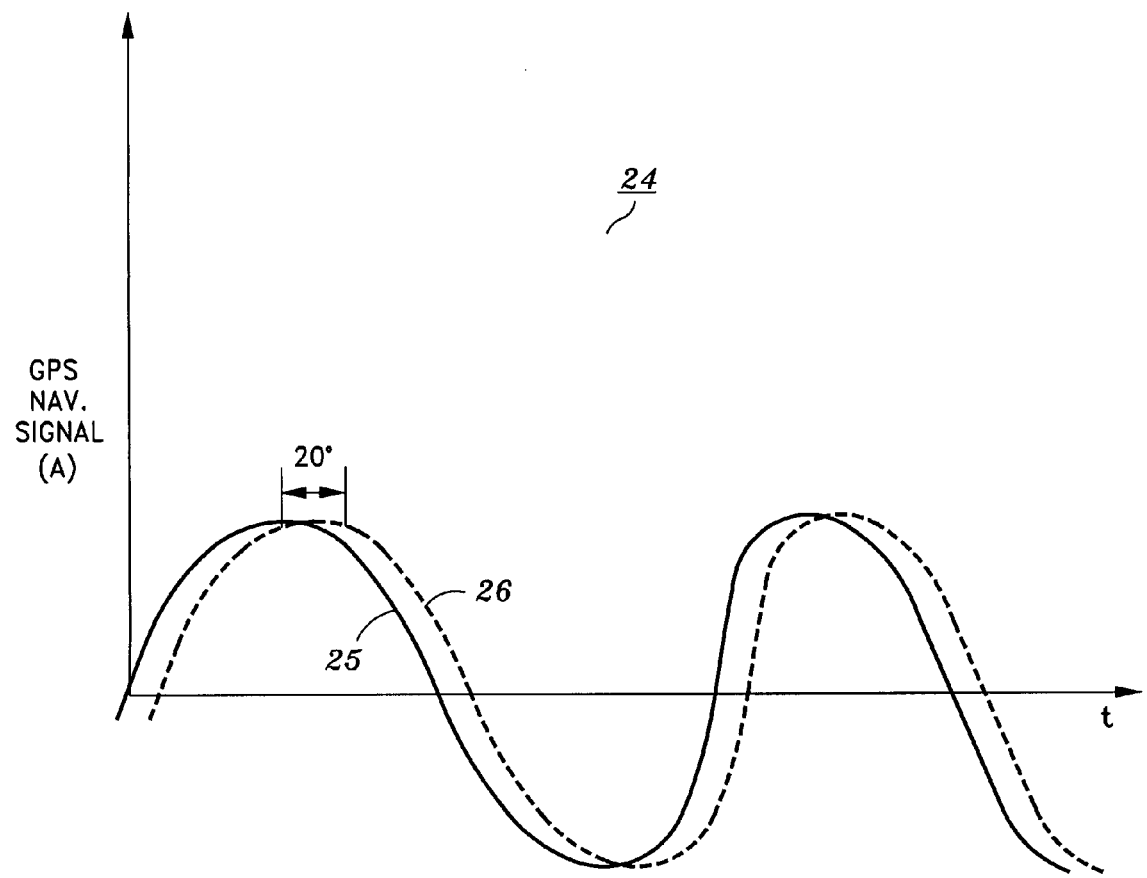
FIG. 2 is a graph depicting the phase shifting of a global positioning system (GPS) navigation signal according to one embodiment of the invention.

FIG. 2 is a graph which depicts the nature of a GPS navigation signal and the shifting of the GPS navigation signal according to the present invention. As seen in FIG. 2, graph 24 depicts GPS navigation signal 25 as a sinusoidal wave form over time. The left axis of graph 24 represents the amplitude of the GPS navigation signal, and the bottom axis represents time. The present invention uses the phase of the GPS navigation signal to alert a GPS receiver that there is an integrity problem with the GPS receiver. For example, referring back to FIG. 1, when GPS satellite 10 detects an error with GPS navigation signal 11, GPS satellite 10 shifts the phase of GPS navigation signal 11 by a predetermined phase shift amount. A GPS receiver that receives GPS navigation signal 11 can then detect the phase shift and decide whether or not to use GPS navigation signal 11. Many GPS receivers in use have the ability to detect a phase shift equal to or greater than 15 degrees, and many newer GPS receivers in use have the ability to detect a phase shift equal to or greater than 5 degrees. In most GPS receivers, a phase shift of greater than 40 degrees will cause the GPS receiver to lose its lock on the GPS navigation signal. As seen in FIG. 2, GPS navigation signal 25 is preferably shifted by a predetermined phase-shift amount of 20 degrees, as depicted by curve 26. In this manner, both older and newer GPS receivers can detect the phase shift and be alerted as to an integrity problem with the GPS navigation signal.

Figure 3:
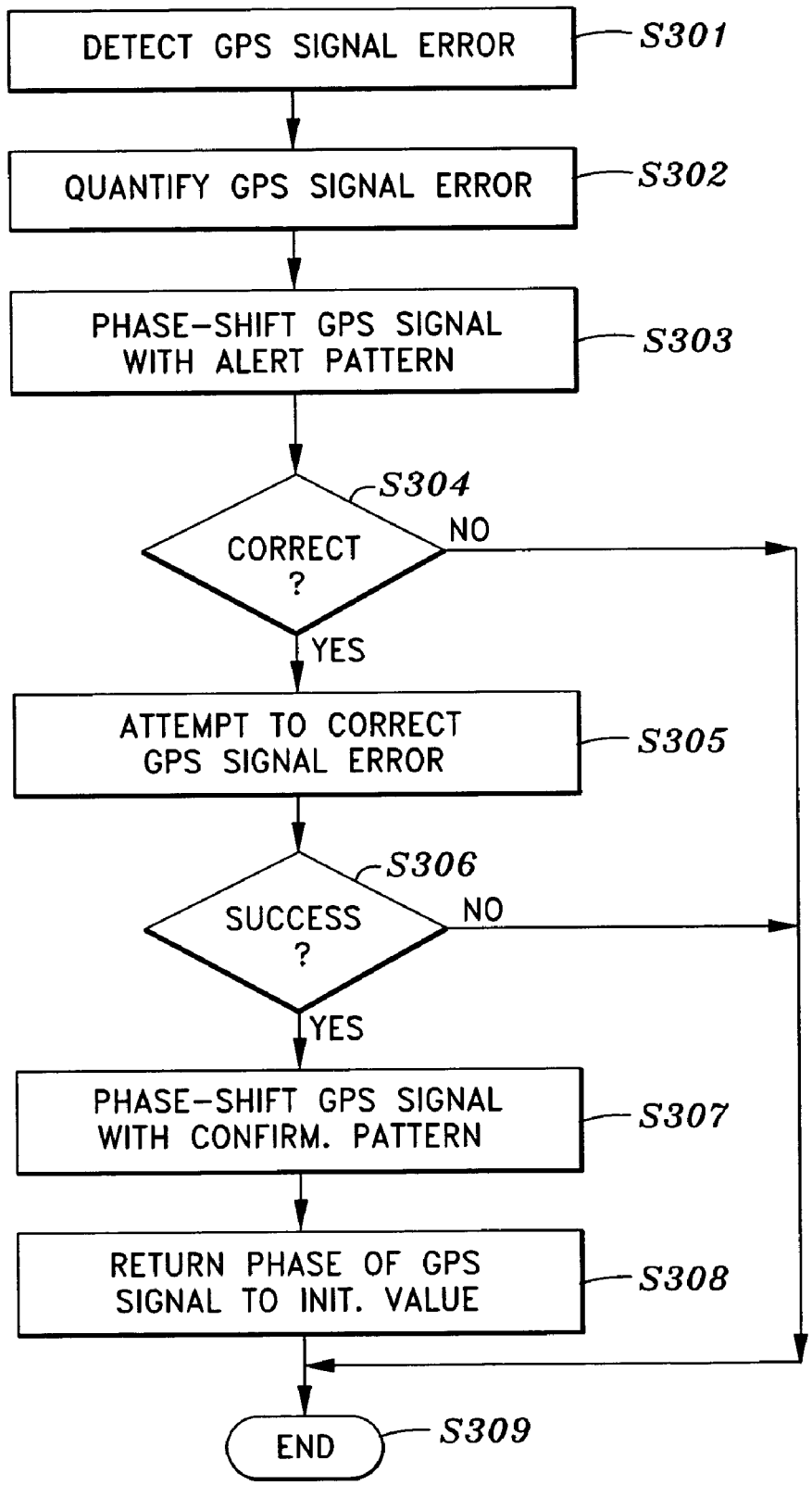
FIG. 3 is a flowchart for explaining phase shifting of the global positioning system (GPS) navigation signal according to one embodiment of the invention.

FIG. 3 is a is a flowchart which sets forth the steps for phase shifting the global positioning system (GPS) navigation signal according to the present invention. First, in step S301, the host device of the GPS navigation signal, such as GPS satellite 10 in FIG. 1, detects and integrity problem with the GPS navigation signal by detecting an error in the signal. This detection can be performed in several different alternative ways, which are discussed in more detail below. Next, the magnitude of the error in the GPS navigation signal is quantified step (S302). For example, it may be determined that the position data of the GPS satellite is off by 1 foot, or by 1000 feet.

In step S303, the GPS navigation signal is phase-shifted by a predetermined phase-shift amount, preferably 20 degrees according to an alert timing pattern, to alert GPS users that the GPS signal has an integrity problem. Preferably, the GPS navigation signal is continuously shifted back and forth between its initial phase value and the predetermined phase shift amount according to the alert timing pattern while the GPS signal has an integrity problem. Also, in one aspect of the invention, the GPS navigation signal can be continuously shifted back and forth between its initial phase value and the predetermined phase-shift amount according to a timing pattern which indicates the quantified magnitude of the detected signal error. These aspects of the phase-shifting of the GPS navigation signal are discussed in more detail below with respect to FIGS. 7A to 7C.

After the alert phase-shifting of the GPS navigation signal is started in step S303, it is determined in step S304 whether or not an attempt should be made to correct the GPS navigation signal error. If no correction attempt is to be made, flow passes to the end in step S309, and the alert phase-shifting of the GPS navigation signal continues. If a correction attempt is to be made, flow passes to step S305 in which appropriate action is taken by the host device (GPS satellite) that transmits the GPS navigation signal. For example, the GPS satellite can take actions to use different hardware to correct the signal, including, but not limited to, switching to another, redundant transmitter for use in transmitting the GPS navigation signal or switching to another, redundant atomic clock for use in generating the GPS navigation signal. In addition to hardware changes, the GPS satellite can also reload a set of ephemeris (position and time) data from a ground station in order to correct the GPS navigation signal and regain its integrity.

After the attempt to correct the GPS navigation signal is made in step S305, it is determined in step S306 whether the correction attempt was successful by determining if the error in the GPS navigation signal is still detected. If the correction attempt was not successful, flow passes to the end in step S309, and the alert phase shifting of the GPS navigation signal is continued. If the correction attempt was successful, flow passes to step S307, in which the GPS navigation signal is phase shifted by a predetermined phase-shift amount according to a confirmation timing pattern, which is different than the alert timing pattern. Preferably, the initial phase shift amount of the GPS navigation signal is 0 degrees, the predetermined phase-shift amount is 20 degrees. In this manner, the confirmation timing pattern lets users of the GPS navigation signal know that there is no longer an error with the signal and that its integrity can be trusted. Then, after the error in the GPS navigation signal has been corrected and the signal has been phase shifted by the predetermined phase-shift amount with the confirmation timing pattern for a predetermined period of time, the GPS navigation signal is returned to the initial phase shift amount (0 degrees) in step S308. Flow then passes to the end in step S309.

Figure 4:
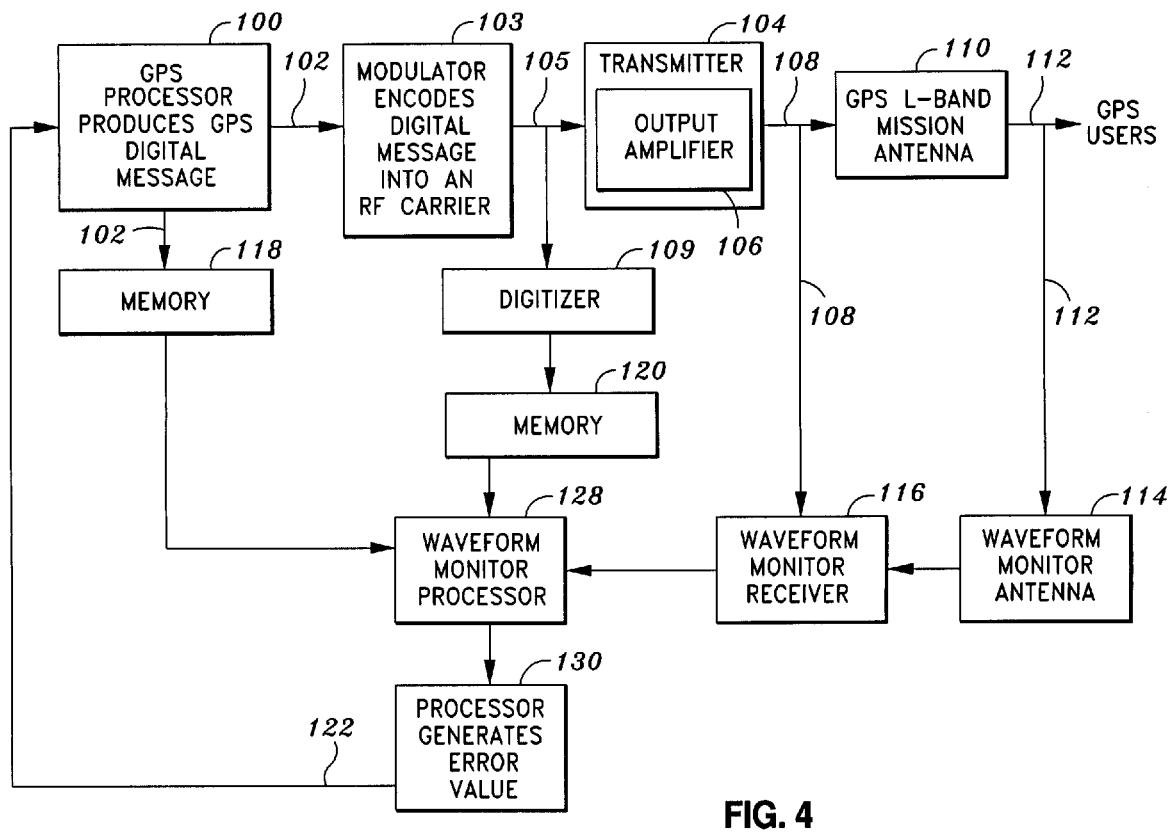
FIG. 4 is a block diagram for explaining error detection of the global positioning system (GPS) navigation signal according to one embodiment of the invention.

FIG. 4 depicts one possible method for detecting an error in the GPS navigation signal according to one aspect of the invention. In particular, this method was presented by applicant in U.S. Pat. No. 6,603,426, which is commonly assigned with the present invention. As seen in FIG. 4, a block diagram illustrates a GPS Automated Satellite Signal Waveform Monitor which allows the GPS satellite to detect its own transmitted waveform. Essentially, the GPS satellite puts an antenna out into its own transmitted signal and receives what it transmits. The GPS satellite then interprets that signal and compares it to what it was supposed to have sent. This waveform monitor will now be described in detail with respect to FIG. 4.

GPS processor 100 in the GPS satellite produces the digital GPS navigation message 102 which is broadcast to all GPS users in view of the satellite. The digital GPS navigation message 102 contains the information necessary to allow the GPS users to determine their exact location. In the current GPS satellite system, the 1500-bit navigation message is broadcast by each GPS satellite at 50 bps on the L1 and/or L2 bands. This navigation message contains system time, clock correction parameters, ionospheric delay model parameters, and the vehicle's ephemeris and health.

A copy of the digital navigation message 102 is stored in memory 118. Navigation message 102 is then sent to modulator 103. Modulator 103 encodes digital navigation message 102 into an RF carrier signal. Modulator 103 outputs encoded RF signal 105 to transmitter 104. Digitizer 109 digitizes the RF signal 105 and stores digital data representing the waveform of RF signal 105 in memory 120.

Transmitter 104 outputs signal 108 to GPS L-band mission antenna 110. Antenna 110 transmits radio frequency GPS signal 112 to GPS users in view of the satellite. Waveform monitor antenna 114 is mounted on the GPS satellite in a side lobe of the satellite's L-band mission antenna 110 and is constructed to provide more than 60 dB of signal attenuation. Waveform monitor antenna 114 receives electromagnetic RF signal 112 being transmitted by GPS transmitting antenna 110. The waveform monitor antenna 114 thus allows the GPS satellite to listen to the very signal that it is transmitting.

Waveform monitor receiver 116 receives RF signal 112 from waveform monitor antenna 114. Waveform monitor processor 128 receives RF signal 112 from waveform monitor receiver 116. Waveform monitor processor 128 extracts the digital navigation message encoded in RF signal 112. Waveform monitor processor 128 performs one or both of the following checks: 1) compares the digital navigation message received from waveform monitor receiver 116 with the digital navigation message stored in memory 118, and/or 2) correlates the waveform of RF signal 112 received from waveform monitor receiver 116 with the waveform data stored in memory 120.

If the GPS system is functioning properly, the received digital navigation message should be the same as the message stored in memory 118, and the received RF waveform should correlate with the waveform data stored in memory 120. In other words, the waveform monitor allows the GPS satellite to listen to the very signal that it is transmitting, and then examine the signal to see if it transmitted what it intended to transmit.

The results of this waveform monitor verification analysis can be used to provide high confidence in the accuracy of the satellite's radiated waveform 112. Processor 130 can generate an error value that indicates the accuracy of the transmitted signal 112 (note that functions performed by processors 100, 128, and 130 illustrated in FIG. 4 could all be performed by one single processor or several different processors).

As an example of waveform monitor operation, if a transmitter element should fail such as transmitter output amplifier 106, the output of transmitter 104 will be distorted. RF signal 112 transmitted to GPS users will correspondingly be corrupted. Waveform monitor receiver 116 will receive this corrupted RF signal 112. Waveform monitor processor 128 will compare the corrupted RF signal 112 to the RF waveform data stored in memory 120. Waveform monitor processor 114 will also attempt to extract a digital navigation message from corrupted RF signal 112 and compare it to the digital navigation message stored in memory 118. By performing these comparisons, waveform monitor processor 128 should thereby detect that the transmitted RF signal 112 is corrupted.

Waveform monitor antenna 114, as just described, monitors the RF signal transmitted from GPS L-band mission antenna 110. However, as an alternative, waveform monitor 116 could monitor the transmitted waveform in other ways. For example, the waveform monitor 116 could tap off the output of transmitter output amplifier 106, and thus monitor the signal 108 coming out of the transmitter output amplifier 106 (this is indicated by the dotted arrow). This signal could then be compared to the data stored in memory 118 and memory 120. It is also possible that the signal could be stored in memory at different locations than the locations shown in FIG. 4. For example, signal 102 between processor 100 and modulator 103 could be stored in memory, and later verified. In this way, the waveform monitor could isolate which portion of the system was producing a distorted waveform, and thereby identify the malfunctioning component.

Figure 5:
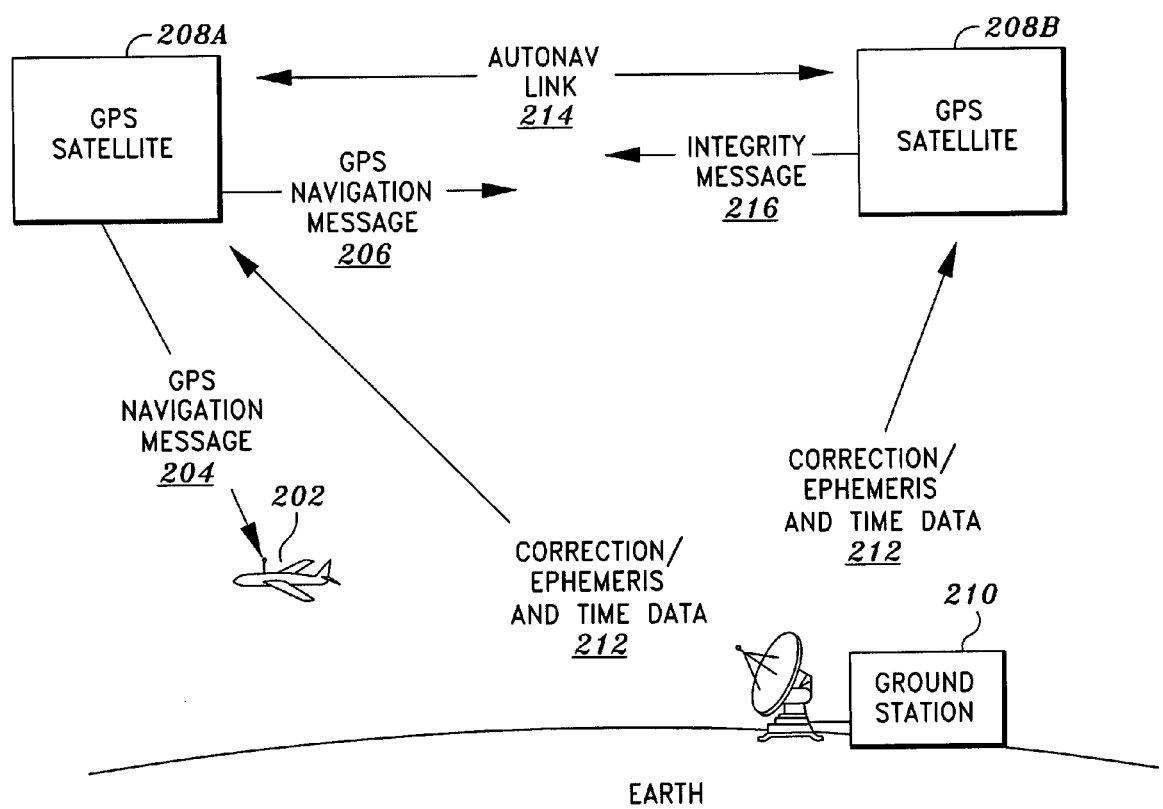
FIG. 5 is a schematic drawing for explaining error detection of the global positioning system (GPS) navigation signal according to an alternative embodiment of the invention.

Another method for detecting an error in the GPS navigation signal is shown in FIG. 5. This method was also presented by applicant in U.S. Pat. No. 6,603,426, which is commonly assigned with the present invention. As seen in FIG. 5, a "GPS Automated Satellite Position Monitor System" is shown. In particular, referring to FIG. 5, GPS satellite 208A broadcasts GPS navigation message 204. All GPS users in view of satellite 208A receive GPS navigation message 204. FIG. 5 depicts aircraft-borne GPS receiver 202 which is shown receiving GPS navigation message 204.

The automated satellite position monitor system of the present invention sends a duplicate 206 of the GPS navigation message to GPS satellite 208B via an RF or optical crosslink. Satellite 208B is a neighboring GPS satellite located in the same orbital plane of the GPS constellation as satellite 208A or, alternatively, in an adjacent plane. Satellite 208B reads the duplicate message 206 sent by GPS satellite 208A. Satellite 208B then verifies the integrity of duplicate message 206 by comparing the contents of duplicate message 206 with data received from GPS ground stations. The data received from GPS ground stations will now be described in more detail.

All GPS satellites currently receive ephemeris data (a list of accurate positions or locations of the satellite as a function of time), time data, and correction data 212 from ground station 210 once every twenty four hours. This data is stored in each GPS satellite 208 and used to correct the GPS signal. Based on this data received from the ground, GPS satellite 208A can determine its own position and correct time at any time or its predicted position at a future time. GPS satellite 208A can also determine the position and corrected time and future predicted position of other satellites in the GPS constellation such as GPS satellite 208B.

Satellite 208B determines the position and time of satellite 208A relative to satellite 208B based on the contents of duplicate message 206. Satellite 208B compares this relative position determination of satellite 208A to the position of satellite 208A as determined by data 212 received from GPS ground stations. If the message position determination matches the ground data position determination within a certain error, then the transmission of GPS satellite 208A is determined to have integrity. If there is not a match, GPS satellite 208A transmission is determined to not have integrity. Thus, a sufficient deviation between the message 206 content and the stored ephemeris data would indicate a satellite 208A-induced error and would be detected by Satellite 208B.

Satellite 208B then sends integrity message 216 back to Satellite 208A via a crosslink. Integrity message 216 informs satellite 208A whether satellite 208A's transmission has integrity, and can include the degree or magnitude of error of satellite 208A's transmission. Satellite 208A can repeat this process with other satellites in the orbital plane to further increase confidence in the accuracy of navigation message 204.

As an alternative to comparing the duplicate GPS navigation message 206 to ground correction/ephemeris data 212, the satellite position monitor system can compare duplicate message 206 to "Autonav" link 214 data. The Autonav feature allows each GPS satellite to determine its own position relative to the positions of the other in-view GPS satellites based on crosslink transmissions over crosslinks with other GPS satellites. Autonav also allows each satellite to achieve a correct relative time with the other satellites in the constellation. Each GPS satellite crosslinks with four or more other GPS satellites to determine correct position and relative time data. Using Autonav in lieu of ground station ephemeris data, GPS satellite 208B can store the ephemeris and time data and predicted positions of GPS satellite 208B based on Autonav data. GPS satellite 208B then compares the duplicate message 206 received from GPS satellite 208A with the predicted position and time of satellite 208A based on Autonav data. In this way, the integrity of the position data in GPS navigation message 206 is determined and reported back to satellite 208A via integrity message 216.

With Autonav installed, GPS satellite 208B can determine the position and time of satellite 208A using the following three methods: (1) determine position based on ephemeris and time data received from ground station 210; (2) determine position and time based on GPS navigation message 206; and (3) determine position and time based on Autonav data.

Any or all of these three methods can be compared to each other to verify the integrity of the transmissions from GPS satellite 208A. In this way, the system provides a real time assessment of the accuracy or integrity of GPS navigation message 204 transmitted from satellite 208A.

Figure 6:
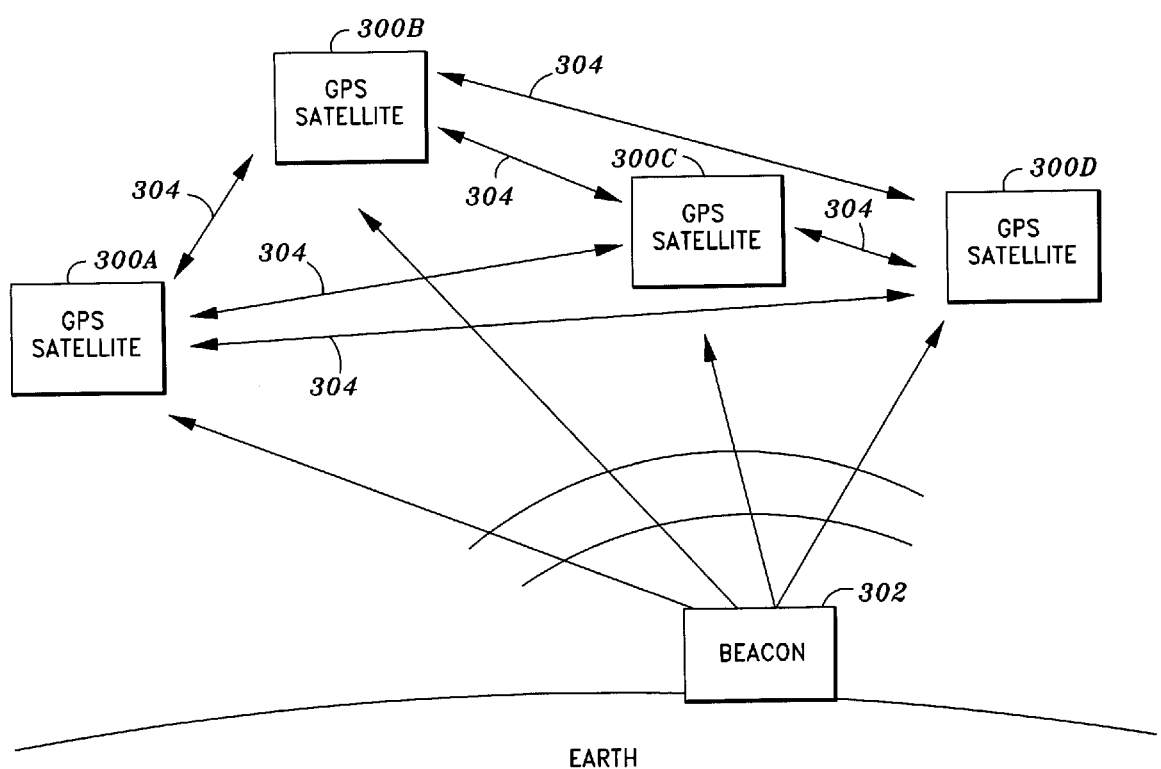
FIG. 6 is a schematic drawing for explaining error detection of the global positioning system (GPS) navigation signal according to yet another alternative embodiment of the invention.

A third method for detecting an error in the GPS navigation signal is shown in FIG. 6. This method was also presented by applicant in U.S. Pat. No. 6,603,426, which is commonly assigned with the present invention. FIG. 6 shows a "GPS Beacon for Auto-registration with Earth Coordinates" which provides a third system and method for verifying the integrity of the GPS system. This system allows the GPS satellite constellation to automatically locate itself with respect to fixed beacon 302 on the earth. Beacon 302 is located at a fixed point on the earth at a known location (i.e. having known earth coordinates). Beacon 302 emits a coded signal pulse having a precise RF waveform that is received by all GPS satellites 300A–300D in view of this location.

The RF signal pulse emitted by beacon 302 is detected by sensors on GPS satellites 300. The RF signal pulse is decoded and processed onboard each GPS satellite 300. Each GPS satellite 300 calculates beacon position data such as the distance between GPS satellite 300 and beacon 302. Each GPS satellite 300 then transmits the beacon position data to the other in-view GPS satellites via inter-satellite links 304. The beacon position data allows each GPS satellite 300 to calculate the relative position of beacon 302. This process can be repeated as frequently as is necessary to provide the desired accuracy. This process of determining the position of beacon 302 by GPS satellite 300 will be referred to herein as "registration." A single beacon 302 may be sufficient to perform registration. Alternatively, multiple beacons can be used, distributed over the earth surface to provide registration for the entire GPS constellation if needed.

Once a GPS satellite 300 determines its position relative to beacon 302, the GPS satellite 300 can calculate its own coordinates in space, since the earth coordinates of the beacon are known. Once the position of the satellite is calculated, this calculated position can be compared with other satellite position data to verify the integrity of the GPS system. As described previously, each GPS satellite 300 can determine its own position based on (1) ephemeris data received from a ground station, and/or (2) based on an Autonav determination. The position of the GPS satellite 300 from either or both of these sources can be compared to the satellite position determination based on the beacon registration. If the positions match within a certain error, then the GPS satellite can verify its own integrity. If there is a deviation greater than the allowed error, then the GPS satellite can alert GPS users by performing phase shifting of the GPS navigation signal.

As an equivalent to the method described above, the GPS satellite can use the satellite position data (such as Autonav) and the beacon position data received from the other GPS satellites to calculate a position of beacon 302. This calculated position of beacon 302 can be compared with the known position of beacon 302 to determine whether a loss of integrity has occurred. Because ground measurements and operation are costly and require substantial resources, it is the preferred embodiment that the GPS beacon position determination is compared to an Autonav determination. The GPS beacon registration, when operated in conjunction with Autonav, provides all the data necessary for verification of GPS operation for position information. Currently, GPS satellites have a system called the Nuclear Detonation (NUDET) Detection System (NDS) which consists of NUDET detection sensors on the GPS satellites that are used to detect and locate nuclear explosions on the ground. NDS allows the GPS satellites to identify the location of RF energy that comes from an explosion on the ground. The GPS Beacon can also use a similar technique to detect RF beacon 302.

Accordingly, regardless of which method is used to detect and quantify the error in the GPS navigation signal, the present invention alerts the GPS users that the integrity of the GPS signal is compromised by shifting the phase of the GPS navigation signal by a predetermined phase shift amount. In this regard, the timing patterns that can be used in the present invention to perform phase shifting of the GPS navigation signal are now described with respect to FIGS. 7A to 7C.

Figure 7A:
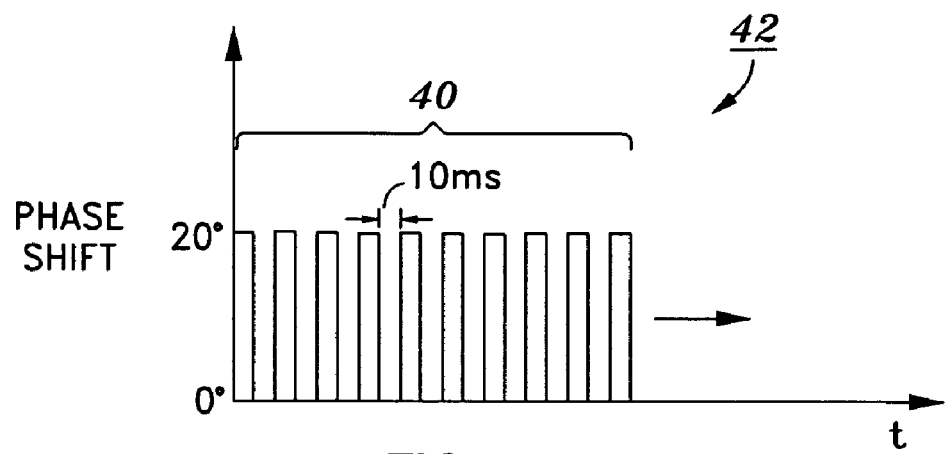
FIGS. 7A to 7C are graphs which depict timing patterns for phase shifting of the global positioning system (GPS) navigation signal according to the present invention.

As seen in FIG. 7A, graph 42 is provided which represents a confirmation phase shift graph of the phase-shifting of the GPS navigation signal over time according to the present invention. In this manner, this timing pattern can be used to let users of the GPS navigation signal know that the GPS navigation signal has integrity by shifting the GPS signal by a predetermined phase shift amount, which is preferably 20 degrees on a constant basis. As seen in the timing pattern of FIG. 7A, the phase of the GPS navigation signal is quickly shifted by twenty (20) degrees and then returned to the initial phase value of zero (0) degrees over a repeated series of cycles. Each phase-shift cycle lasts for a period of twenty milliseconds, in which the GPS navigation signal is phase-shifted by twenty (20) degrees for a predetermined time of ten milliseconds, and then is returned to the initial phase value of zero (0) degrees for a predetermined time of ten milliseconds. This pattern of cycles is repeated continuously as long as the GPS signal has integrity.

Figure 7B:
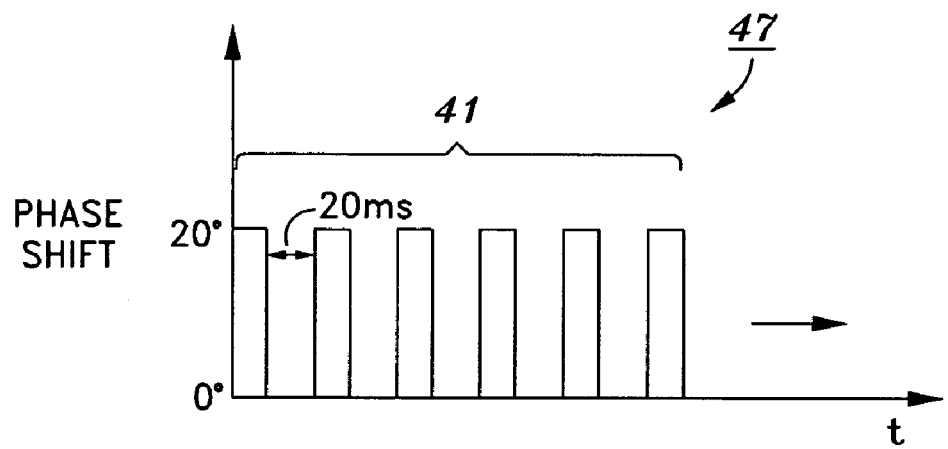

In FIG. 7B, graph 47 depicts an alert phase shift graph which is used to alert users of a moderate GPS signal error. Once a GPS satellite detects that there is a moderate error in the GPS navigation signal, and therefore a lack of signal integrity, the GPS satellite alerts users of the GPS navigation signal error by phase shifting the GPS signal by the predetermined phase shift amount according to an alert timing pattern that indicates the moderate degree of detected error. As seen in the timing pattern of FIG. 7B, the phase of the GPS navigation signal is quickly shifted by twenty (20) degrees and then returned to the initial phase value of zero (0) degrees over a repeated series of cycles. Each phase-shift cycle lasts for a period of forty milliseconds, in which the GPS navigation signal is phase-shifted by twenty (20) degrees for a predetermined time of twenty milliseconds, and then is returned to the initial phase value of zero (0) degrees for a predetermined time of twenty milliseconds. The timing pattern of FIG. 7B is repeated continuously as long as the moderate level of error in the GPS navigation signal is detected.

Figure 7C:
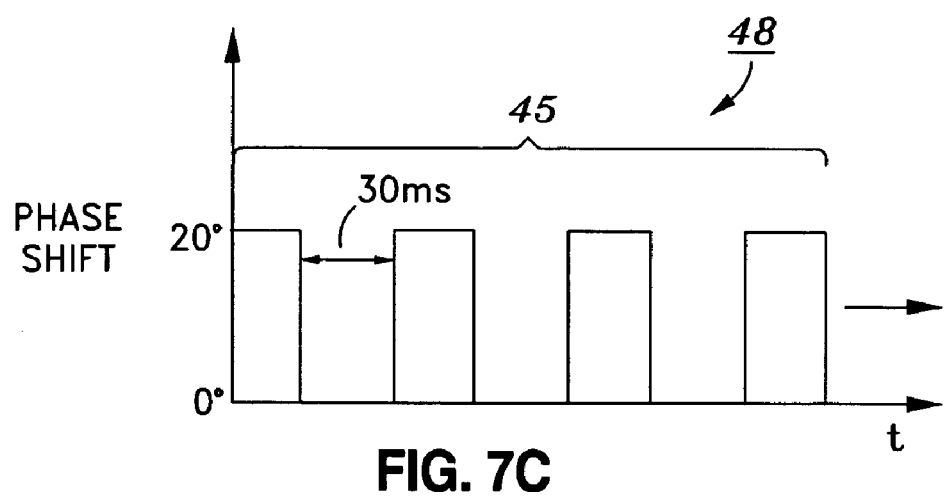

FIG. 7C shows graph 45 which depicts an alert phase shift graph which is used to alert users of a serious GPS signal error. Once a GPS satellite detects that there is a serious error in the GPS navigation signal, and therefore a lack of signal integrity, the GPS satellite alerts users of the GPS navigation signal error by phase shifting the GPS signal by the predetermined phase shift amount according to an alert timing pattern that indicates the serious degree of the detected error. As seen in the timing pattern of FIG. 7C, the phase of the GPS navigation signal is quickly shifted by twenty (20) degrees and then returned to the initial phase value of zero (0) degrees over a repeated series of cycles. Each phase-shift cycle lasts for a period of sixty milliseconds, in which the GPS navigation signal is phase-shifted by twenty (20) degrees for a predetermined time of thirty milliseconds, and then is returned to the initial phase value of zero (0) degrees for a predetermined time of thirty milliseconds. The timing pattern of FIG. 7C is repeated continuously as long as the serious level of error in the GPS navigation signal is detected. Of course, it should be appreciated that other types of phase-shifting timing patterns can also be used in the present invention to indicate information to GPS users about the integrity of the GPS signal.

Accordingly, the arrangement of the present invention provides for the ability of a GPS satellite to verify the accuracy and/or integrity of its own GPS signal, and then to alert a user of the GPS signal error simply by shifting the phase of the GPS signal from an initial value by a predetermined alert phase-shift amount. The GPS user/receiver can then detect the phase shift which indicates an error with the GPS signal, and decide whether or not to use, or continue using, that particular GPS signal, without the need for an expensive ground integrity system, and without the need for a separate integrity message or communication channel.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for alerting a user of an integrity error in a global positioning system (GPS) signal transmitted from a transmitter in a global positioning system (GPS) satellite, the method comprising the steps of:
   detecting an error in the global positioning system (GPS) signal;
   alerting the user of the error by shifting a phase of the global positioning system (GPS) signal from an initial value by a predetermined phase-shift amount; and
   returning, in the case that the detected error is corrected, the phase of the global positioning system (GPS) signal to the initial value.

2. A method according to claim 1, further including the step of quantifying an error amount for the error in the global positioning system (GPS) signal, wherein, in the alerting step, an alert timing pattern for shifting the phase by the predetermined phase-shift amount is set in accordance with the quantified error amount.

3. A method according to claim 1, further including the steps of:
   correcting the error in the global positioning system (GPS) signal; and
   confirming the correction to the user by shifting the phase of the global positioning system (GPS) signal by the predetermined phase-shift amount according to a confirmation timing pattern.

4. A method according to claim 1, wherein the predetermined phase-shift amount is 20 degrees and the initial value is 0 degrees.

5. A method according to claim 3, wherein, in the correcting step, the error is corrected in the global positioning system (GPS) satellite by transmitting the global positioning system (GPS) signal from a redundant transmitter.

6. A method according to claim 3, wherein, in the correcting step, the error is corrected in the global positioning system (GPS) satellite by reloading a set of ephemeris data.

7. A method according to claim 3, wherein, in the correcting step, the error is corrected in the global positioning system (GPS) satellite by using a redundant atomic clock.

8. A method according to claim 1, wherein, in the detecting step, the error in the global positioning system (GPS) signal is detected by a monitoring the global positioning system (GPS) signal with a monitoring receiver mounted on the global positioning system (GPS) satellite.

9. A method according to claim 1, wherein, in the detecting step, the error in the global positioning system (GPS) signal is detected by receiving the global positioning system (GPS) signal at a ground station having a known location, determining a calculated location based on the received global positioning system (GPS) signal, comparing the calculated location with the known location to determine the error, and sending a correction message containing the error from the ground station to the global positioning system (GPS) satellite.

10. A method according to claim 2, wherein the alert timing pattern is comprised of a plurality of cycles, wherein, in each cycle, the phase is shifted from the initial value by the predetermined phase-shift amount for a predetermined time and then returned to the initial value for the predetermined time.

11. A method according to claim 10, wherein the predetermined time is equal to or greater than 10 milliseconds.

12. A method according to claim 3, wherein the confirmation timing pattern is comprised of a plurality of cycles, wherein, in each cycle, the phase is shifted from the initial value by the predetermined phase-shift amount for a predetermined time and then returned to the initial value for the predetermined time.

13. A method according to claim 12, wherein the predetermined time is equal to 10 milliseconds.

14. A method for alerting a user of an integrity error in a global positioning system (GPS) signal transmitted from a transmitter in a global positioning system (GPS) satellite, the method comprising the steps of:
- detecting an error in the global positioning system (GPS) signal;
- quantifying an error amount for the error in the global positioning system (GPS) signal;
- setting an alert timing pattern for shifting the phase by a predetermined phase-shift amount in accordance with the quantified error amount;
- alerting the user of the error by shifting a phase of the global positioning system (GPS) signal from an initial value by the predetermined phase-shift amount in accordance with the alert timing pattern;
- correcting the error in the global positioning system (GPS) signal;
- confirming the correction to the user by shifting the phase of the global positioning system (GPS) signal by the predetermined phase-shift amount in accordance with a confirmation timing pattern; and
- returning the phase of the global positioning system (GPS) signal to the initial value.

15. A computing apparatus provided in a global positioning system (GPS) satellite, the computing apparatus comprising:
- a processor; and
- a memory which stores computer-executable process steps to alert a user of an integrity error in a global positioning system (GPS) signal transmitted from a transmitter in the global positioning system (GPS) satellite, the computer-executable process steps including steps to perform a method according to any of claims 1 to 14.

16. A computing apparatus provided in a global positioning system (GPS) satellite for alerting a user of an integrity error in a global positioning system (GPS) signal transmitted from a transmitter in the global positioning system (GPS) satellite, the computing apparatus comprising:
- detecting means for detecting an error in the global positioning system (GPS) signal;
- alerting means for alerting the user of the error by shifting a phase of the global positioning system (GPS) signal from an initial value by a predetermined phase-shift amount; and
- returning means for returning, in the case that the detected error is corrected, the phase of the global positioning system (GPS) signal to the initial value.

* * * * *